US011880694B2

(12) United States Patent
Devta et al.

(10) Patent No.: US 11,880,694 B2
(45) Date of Patent: Jan. 23, 2024

(54) SYSTEM AND METHOD FOR BEHAVIOR INJECTION IN CLOUD COMPUTING PLATFORMS OR APPLICATIONS

(71) Applicant: ORACLE INTERNATIONAL CORPORATION, Redwood Shores, CA (US)

(72) Inventors: Prakash Kumar Devta, Bengaluru (IN); Dinesh Chandra Pant, Bengaluru (IN); Srimant Misra, Bengaluru (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 74 days.

(21) Appl. No.: 16/883,717

(22) Filed: May 26, 2020

(65) Prior Publication Data
US 2021/0373915 A1 Dec. 2, 2021

(51) Int. Cl.
*G06F 9/445* (2018.01)
*G06F 9/50* (2006.01)
*G06F 9/54* (2006.01)
*H04L 29/08* (2006.01)
*H04L 67/125* (2022.01)

(52) U.S. Cl.
CPC ........ *G06F 9/44521* (2013.01); *G06F 9/5072* (2013.01); *G06F 9/547* (2013.01); *H04L 67/125* (2013.01)

(58) Field of Classification Search
None
See application file for complete search history.

(56) References Cited

U.S. PATENT DOCUMENTS

| 9,043,458 | B2 * | 5/2015 | Balaji | H04L 43/04 709/224 |
| 9,495,342 | B2 * | 11/2016 | Lawrance | G06F 40/166 |
| 9,742,852 | B2 * | 8/2017 | Kaiser | H04L 67/16 |

(Continued)

OTHER PUBLICATIONS

Truyen et al.; "Context-oriented Programming for Customizable Saas Applications"; Mar. 2012; Association for Computing Machinery, New York, NY, United States; SAC 2012: Proceedings of the 27th Annual ACM Symposium on Applied Computing. (Year: 2012).*

*Primary Examiner* — Umut Onat
(74) *Attorney, Agent, or Firm* — TUCKER ELLIS LLP

(57) ABSTRACT

In accordance with an embodiment, described herein is a system and method for behavior injection in a cloud computing platform (cloud platform) or software application, including the use of injection points to modify the operation or behavior of a tenant platform environment. An injection service enables a cloud platform provider to configure software code/behaviors to be injected into cloud platform modules or other components associated with tenants, including mapping, for a tenant-specific globally unique identifier (GUID) associated with a lifecycle activity injection point, a behavior including a platform code or process and metadata that can be used to inject and modify operation of a corresponding module. The described approach enables a cloud platform to expose behavioral aspects of the cloud platform or a software application executing therein, so that they can be controlled or modified in a dynamic manner, from outside of the cloud platform.

15 Claims, 15 Drawing Sheets

(56) References Cited

U.S. PATENT DOCUMENTS

| | | | | |
|---|---|---|---|---|
| 10,157,196 B2* | 12/2018 | Baker | | G06F 16/23 |
| 10,635,433 B2* | 4/2020 | Khoongumjorn | | G06F 8/71 |
| 10,838,774 B2* | 11/2020 | Christudas | | H04L 41/0813 |
| 10,963,557 B2* | 3/2021 | Goodridge | | G06F 9/445 |
| 11,157,509 B2* | 10/2021 | Gujarathi | | G06F 16/40 |
| 2005/0091641 A1* | 4/2005 | Starbuck | | G06F 9/451 |
| | | | | 717/122 |
| 2014/0289391 A1* | 9/2014 | Balaji | | H04L 43/04 |
| | | | | 709/224 |
| 2017/0235466 A1* | 8/2017 | Tanwir | | G06F 3/0481 |
| | | | | 715/738 |
| 2017/0235936 A1* | 8/2017 | de los Rios | | G06F 21/36 |
| | | | | 726/19 |
| 2020/0125418 A1* | 4/2020 | Christudas | | G06F 9/547 |

* cited by examiner

SYSTEM AND METHOD FOR BEHAVIOR INJECTION IN CLOUD COMPUTING PLATFORMS OR APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing environments, and are particularly related to systems and methods for behavior injection in a cloud computing platform or software application executing therein, including the use of injection points to modify the operation or behavior of a tenant platform environment.

BACKGROUND

In a cloud computing environment that supports multiple tenants, software applications can be associated with lifecycle activities that determine a runtime behavior or how the software applications operate.

However, software application bugs or other technical issues may arise from time to time that are associated either with the cloud environment itself, or with a particular software application. Different tenants may have different requirements as to the behavior of the cloud environment or their software applications, which may in turn necessitate a version update to the cloud environment. However, such a change of behavior may not be applicable to all tenants, but may instead be required only by certain tenants.

SUMMARY

In accordance with an embodiment, described herein is a system and method for behavior injection in a cloud computing platform (cloud platform) or software application, including the use of injection points to modify the operation or behavior of a tenant platform environment. An injection service enables a cloud platform provider to configure software code/behaviors to be injected into cloud platform modules or other components associated with tenants, including mapping, for a tenant-specific globally unique identifier (GUID) associated with a lifecycle activity injection point, a behavior including a platform code or process and metadata that can be used to inject and modify operation of a corresponding module. The described approach enables a cloud platform to expose behavioral aspects of the cloud platform or a software application executing therein, so that they can be controlled or modified in a dynamic manner, from outside of the cloud platform.

DETAILED DESCRIPTION

As described above, in a cloud computing environment that supports multiple tenants, software applications can be associated with lifecycle activities that determine a runtime behavior or how the software applications operate.

However, software application bugs or other technical issues may arise from time to time that are associated either with the cloud environment itself, or with a particular software application. Different tenants may have different requirements as to the behavior of the cloud environment or their software applications, which may in turn necessitate a version update to the cloud environment. However, such a change of behavior may not be applicable to all tenants, but may instead be required only by certain tenants.

Preparing a version update to a cloud environment or cloud platform generally takes several days, while tenants (customer) wait for that update to be available. As an alternative, a tenant's platform instance can be patched to provide the change in functionality. However, patching generally requires downtime for that platform instance, and may not be readily duplicated in other platform instances or platform versions. Some cloud environments, such as Oracle Cloud, support the use of feature flags that allow various features to be provided within a cloud platform, but not made active unless turned on. However, such features still need to be pre-configured or pre-installed into the platform, for example through a version update or patching, so that they can be later activated, and as such cannot be provided dynamically.

In accordance with an embodiment, described herein is a system and method for behavior injection in a cloud computing platform (cloud platform) or software application, including the use of injection points to modify the operation or behavior of a tenant platform environment. An injection service enables a cloud platform provider to configure software code/behaviors to be injected into cloud platform modules or other components associated with tenants, including mapping, for a tenant-specific globally unique identifier (GUID) associated with a lifecycle activity injection point, a behavior including a platform code or process and metadata that can be used to inject and modify operation of a corresponding module. The described approach enables a cloud platform to expose behavioral aspects of the cloud platform or a software application executing therein, so that they can be controlled or modified in a dynamic manner, from outside of the cloud platform.

In accordance with an embodiment, a technical advantage of the described systems and methods includes that the described approach enables a cloud platform to expose behavioral aspects of the cloud platform or a software application executing therein, so that they can be controlled or modified in a dynamic manner, from outside of the cloud platform.

Cloud Platforms

Figure 1:
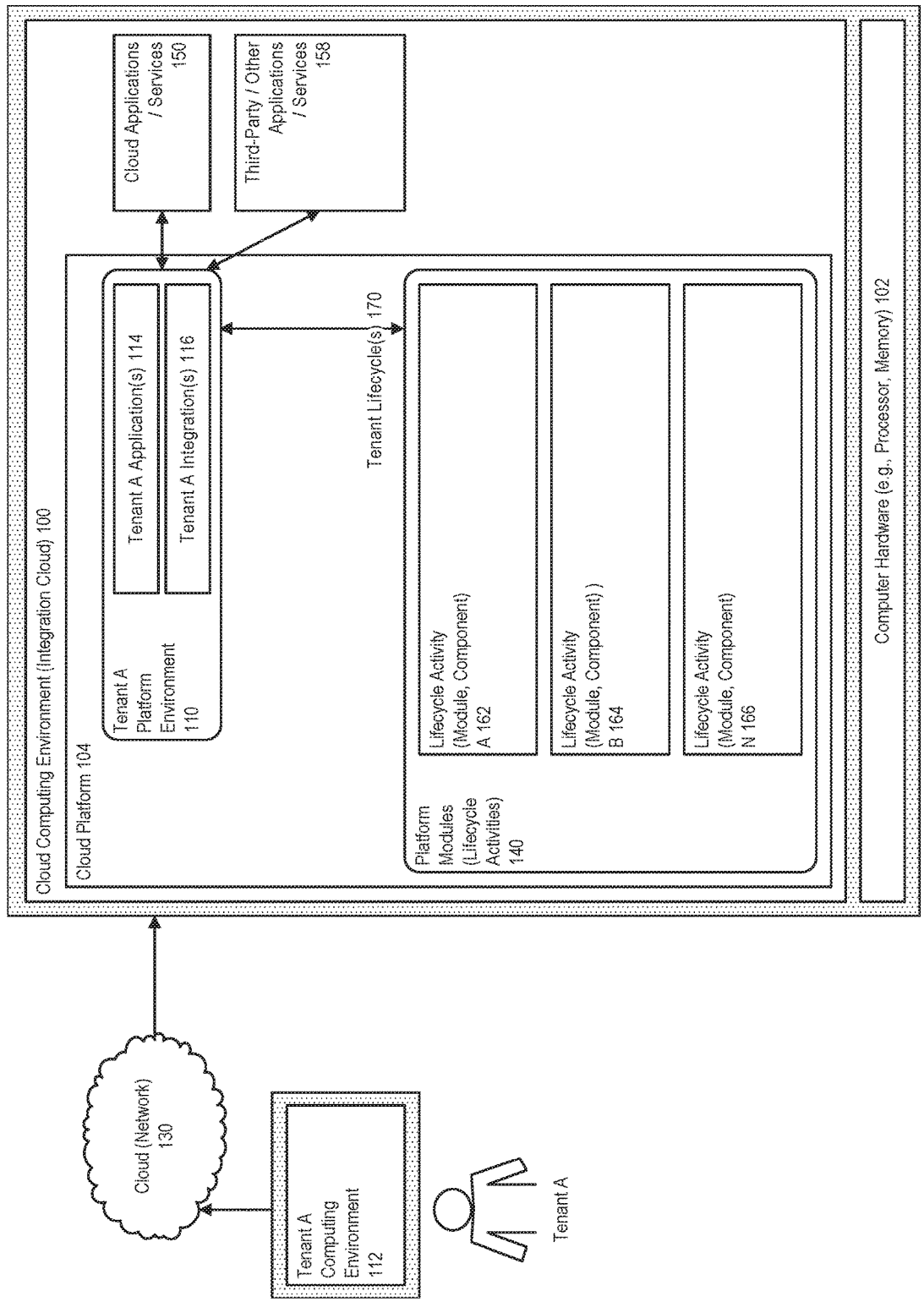
FIG. 1 illustrates a system for behavior injection in a cloud computing platform or software application executing therein, in accordance with an embodiment.

FIG. 1 illustrates a system for behavior injection in cloud computing platforms or software applications, in accordance with an embodiment.

As illustrated in FIG. 1, in accordance with an embodiment, a cloud computing environment (cloud environment) 100, such as for example an integration cloud, operating at one or more computers that includes a computer hardware (e.g., processor, memory) 102, can be used to provide a cloud computing platform (cloud platform) 104.

In accordance with an embodiment, examples of such a cloud environment and cloud platform can include Oracle Cloud and Oracle Integration Cloud (OIC) respectively. In accordance with various embodiments, the teachings described herein can also be used with other types of cloud environment or cloud platform, including, for example, other types of platform-as-a-service (PaaS) cloud environments or cloud platforms.

In accordance with an embodiment, each of a plurality of tenants of the cloud environment, for example a first tenant A, can be associated with a tenant platform environment 110, for use with the tenant's computing environment 112, and with one or more cloud software application(s) 114, and/or integration(s) 116. For example in accordance with an embodiment, the tenant can access their platform environment from an on-premise computing environment via a cloud environment 130 or other type of network or communication environment.

In accordance with an embodiment, a tenant platform environment can utilize one or more platform modules 140, cloud software applications or services 150, or third-party or other software applications or services 158, provided by the cloud platform. The cloud platform can orchestrate use by the tenant platform environment, or by software applications executing therein, of various lifecycle activities provided within cloud platform as modules (components) A 162, B 164, N 168, as part of a tenant lifecycle 170 associated with those modules.

For example, in accordance with an embodiment, a cloud platform operating as an integration platform can orchestrate various software applications and multiple modules working together, such as, for example, activation, connection test, metadata loading, invoke target endpoint, transformation, request received by an integration, or various other types of modules; and can provide various lifecycle activities performed by these modules. During runtime, the modules can then execute the lifecycle activities to address various use-cases.

In accordance with an embodiment, the various components and processes illustrated in FIG. 1, and as further described herein with regard to various embodiments, can be provided as software or program code executable by a computer system or other type of processing device. For example, in accordance with an embodiment, the components and processes described herein can be provided by a cloud computing system, or by another suitably-programmed computer system.

Figure 2:
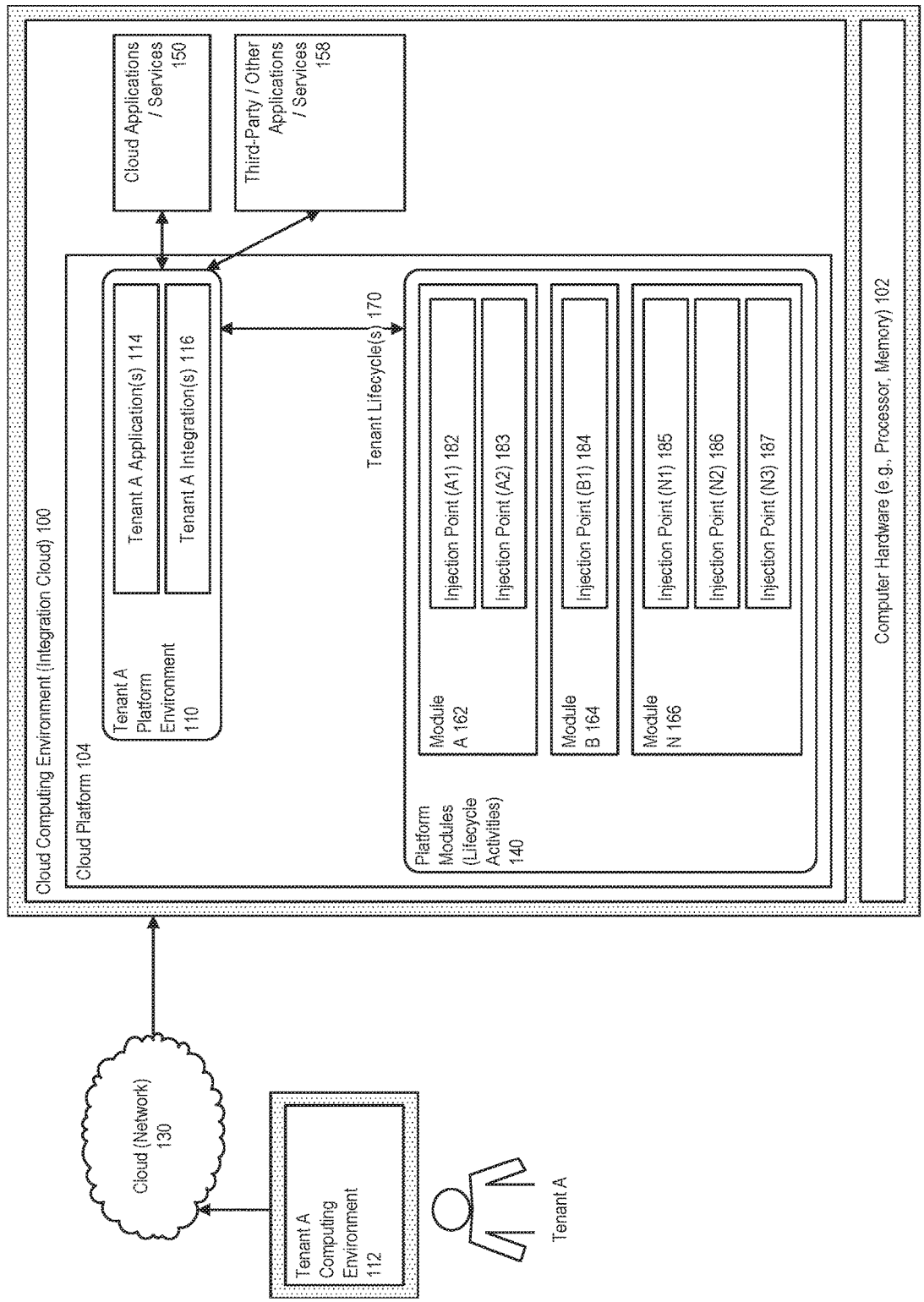
FIG. 2 further illustrates a system for behavior injection in cloud computing platforms or software applications, in accordance with an embodiment.

FIG. 2 further illustrates a system for behavior injection in cloud computing platforms or software applications, in accordance with an embodiment.

As illustrated in FIG. 2, in accordance with an embodiment, each of one or more modules can be associated with one or more injection points or hooks by which to associate a platform code or process. For example, as illustrated in FIG. 2, a first module A can be associated with injection points (A1) 182 and (A2) 183; while a second module B can be associated with an injection points (B1) 184; and a third module C can be associated with injection points (C1) 185, (C2) 186, and (A3) 187; each of which can be used to inject a platform code or process to control or modify operation of the module.

Figure 3:
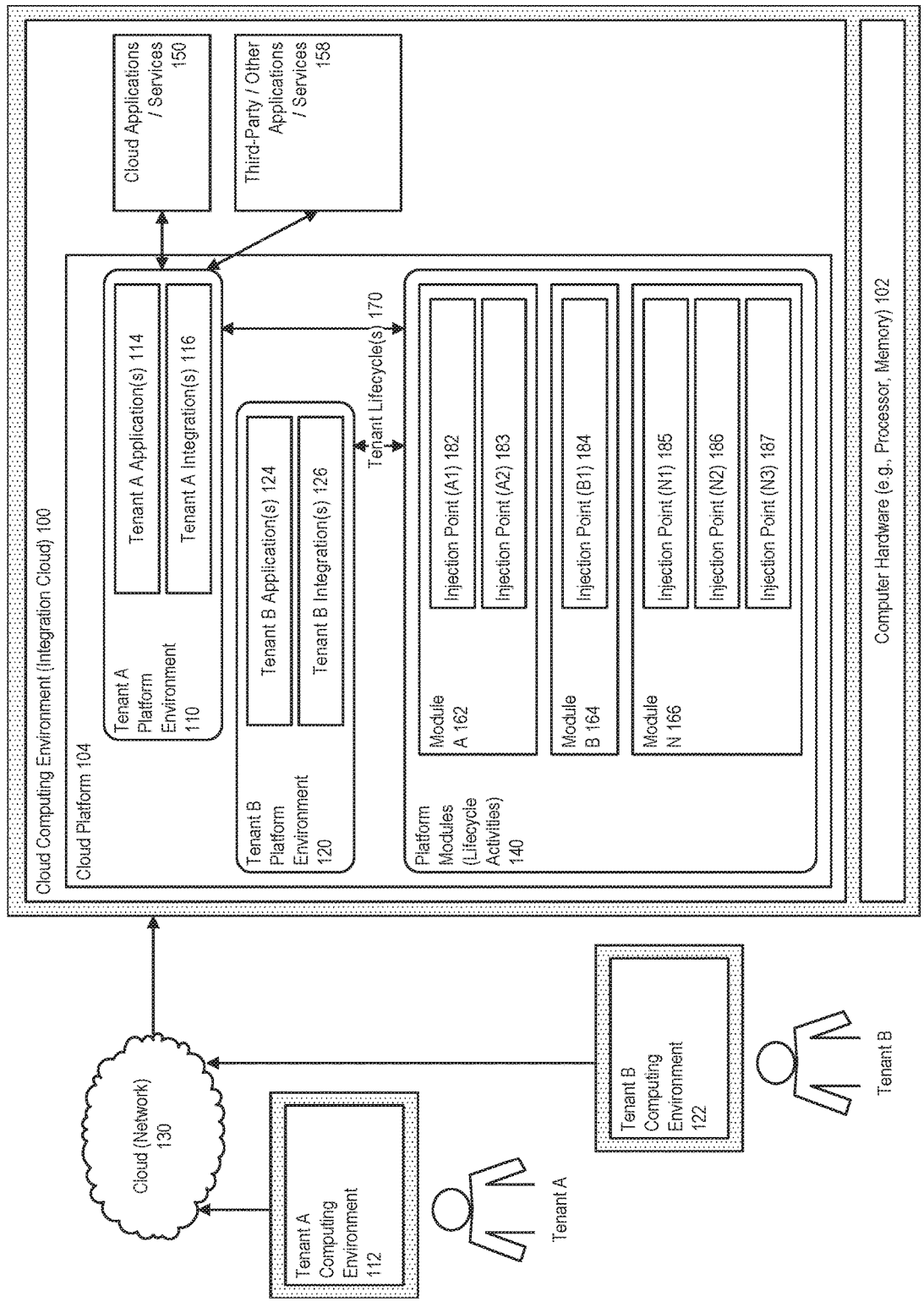
FIG. 3 further illustrates a system for behavior injection in cloud computing platforms or software applications, in accordance with an embodiment.

FIG. 3 further illustrates a system for behavior injection in cloud computing platforms or software applications, in accordance with an embodiment.

As illustrated in FIG. 3, in accordance with an embodiment, a second tenant B can be similarly associated with a tenant platform environment 120, for use with the tenant's computing environment 122, and with one or more cloud software application(s) 124, and/or integration(s) 126; and can similarly access their platform environment from an on-premise computing environment via the cloud environment.

However, different tenants may have different requirements as to the behavior of the cloud environment or their software applications; and such behavior may not be applicable to all tenants, but may instead be required only by certain tenants.

In accordance with an embodiment, to address this, injection points associated with various modules can be used inject a platform code or process to modify or control the operation of that module. For example, in an OIC or other cloud platform or cloud environment, such injection points can be used, for example to:

EXAMPLE 1

In an example of invoking a target endpoint, if a target endpoint changes its contract due to technical reasons, then the system can use injection to immediately change the caller's behavior by injecting the change of behavior.

EXAMPLE 2

In another example of regression caused by a feature or bug fix. If the regression is related to the lifecycle activities, then injection can be used to fix the issue in runtime until the actual fix is made available by the cloud platform.

EXAMPLE 3

In yet another example, injection is useful for debugging intermittent issues for certain tenants.

Configuration of Injection Points

Figure 4:
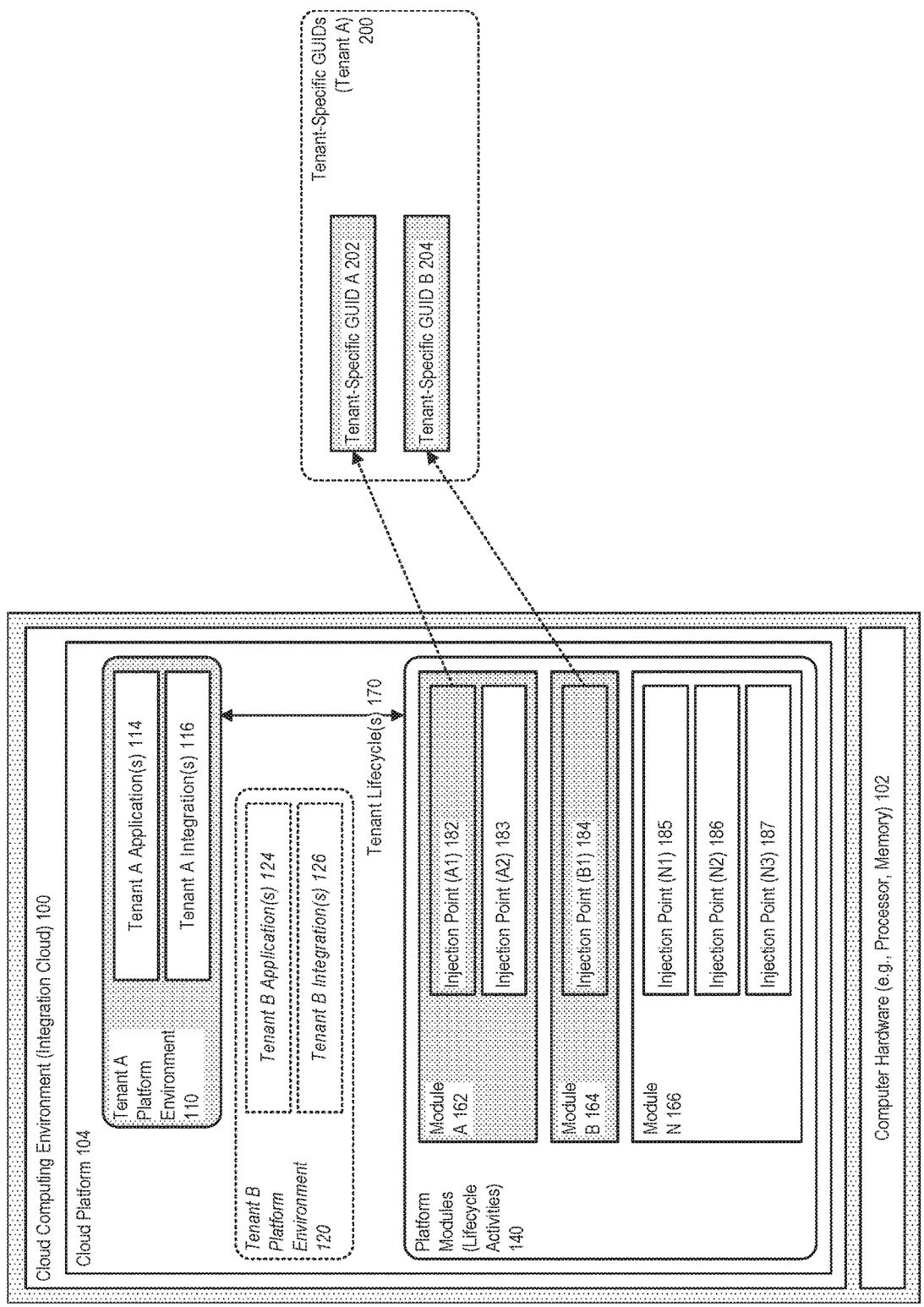
FIG. 4 further illustrates a system for behavior injection in cloud computing platforms or software applications, in accordance with an embodiment.

FIG. 4 further illustrates a system for behavior injection in cloud computing platforms or software applications, in accordance with an embodiment.

As illustrated in FIG. 4, in accordance with an embodiment, each particular tenant can be associated with one or more tenant-specific globally unique identifiers (GUID) associated with lifecycle activity injection points. In the example illustrated in FIG. 4, a first tenant A can be associated with a plurality of tenant-specific GUIDs 200, including a first GUID A 202 that references injection point (A1) in module A; and a second GUID B 204 that references injection point (B1) in module B.

Generally described, in accordance with an embodiment, a tenant-specific GUID can be used to indicate the association of one or more (or all) tenants, with one or more module injection points, for purposes of requesting and receiving platform codes or processes from an injection service, as further described below.

Figure 5:
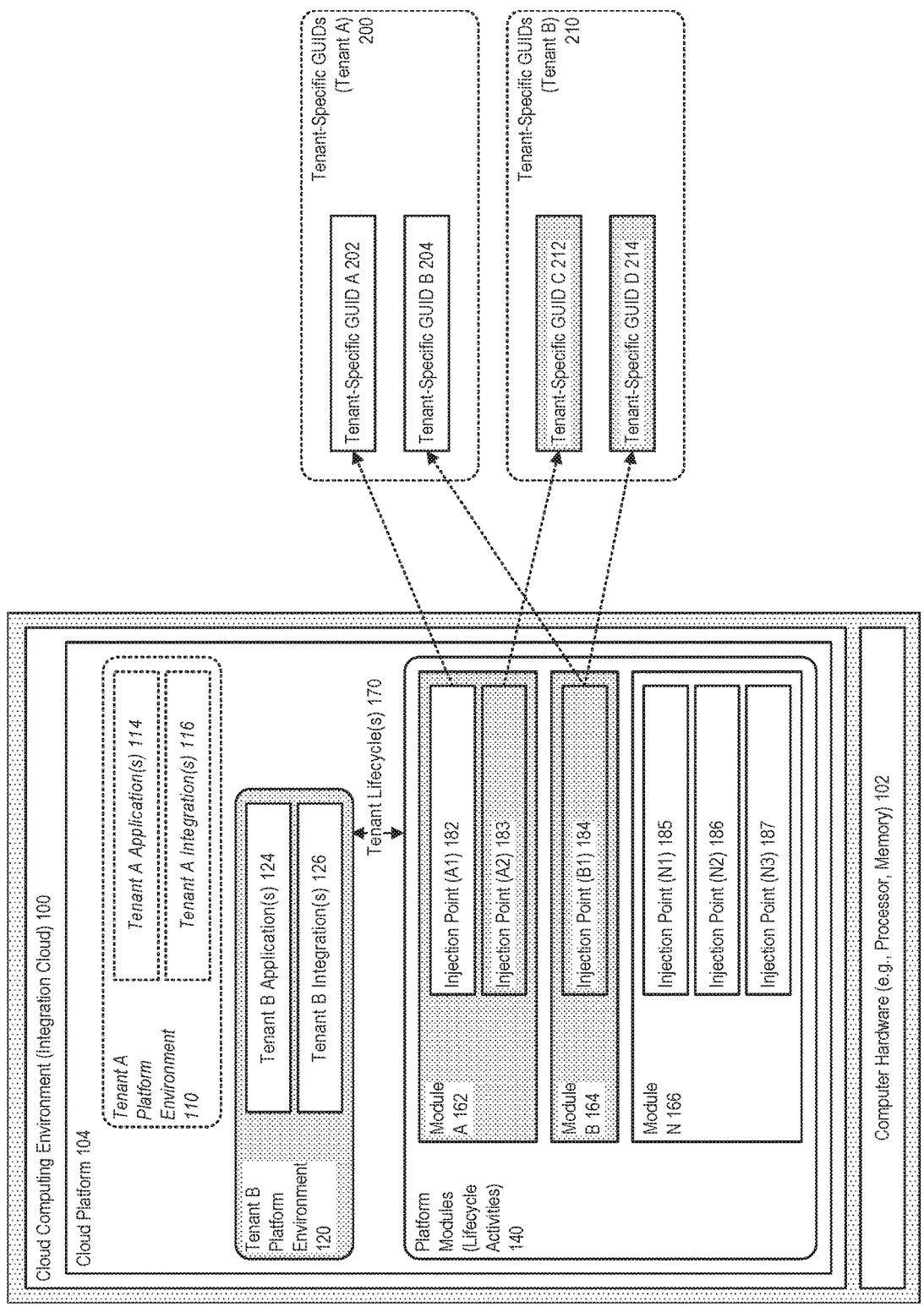
FIG. 5 further illustrates a system for behavior injection in cloud computing platforms or software applications, in accordance with an embodiment.

FIG. 5 further illustrates a system for behavior injection in cloud computing platforms or software applications, in accordance with an embodiment.

As illustrated in FIG. 5, in accordance with an embodiment, in this example a second tenant B can be associated with a plurality of tenant-specific GUIDs 210, including a first GUID C 212 that references injection point (A2) in module A; and a second GUID D 214 that references injection point (B1) in module B.

Figure 6:
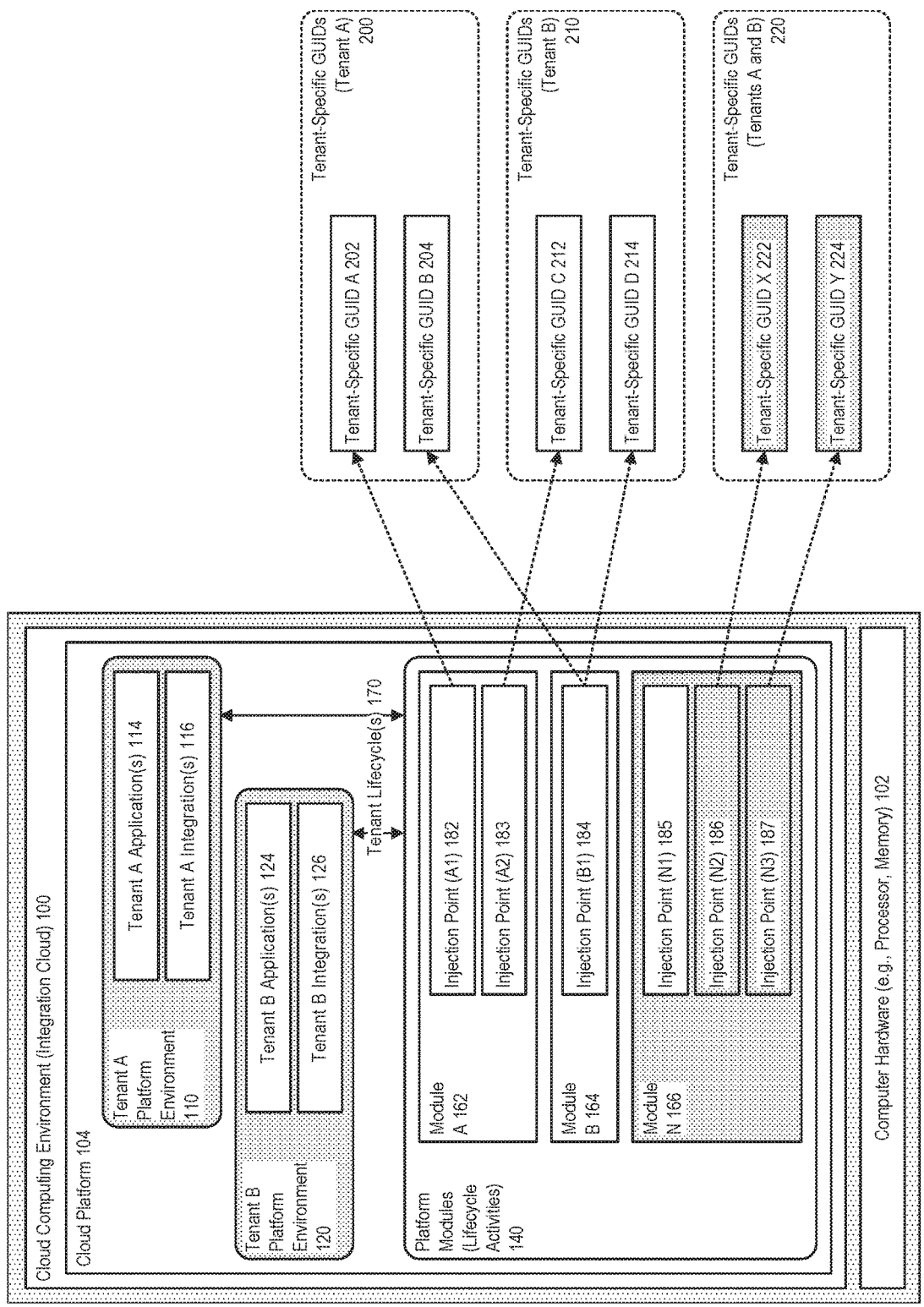
FIG. 6 further illustrates a system for behavior injection in cloud computing platforms or software applications, in accordance with an embodiment.

FIG. 6 further illustrates a system for behavior injection in cloud computing platforms or software applications, in accordance with an embodiment.

As illustrated in FIG. 6, in accordance with an embodiment, in this example with a plurality of tenant-specific GUIDs 220, including a first GUID X 222 that references injection point (N2) in module N; and a second GUID Y 224 that references injection point (N2) in module N can be used in associated with both tenants A and B. Using such a GUID that can be matched to multiple tenants, can enable an injected behavior to be associated with those multiple tenants.

As such, each tenant-specific GUID need not necessarily be specific to a single tenant, but can instead be specific to a selection or number of tenants, or indeed to all tenants, depending on how widespread the injection is intended to be employed throughout one or more, or all of the tenants of the cloud environment, as appropriate.

The above examples are provided for purposes of illustration. In accordance with various embodiments, different arrangements of tenant-specific GUIDs and associated with one or more, or all of the tenants of the cloud environment can be used, to address various use cases.

Injection Service

Figure 7:
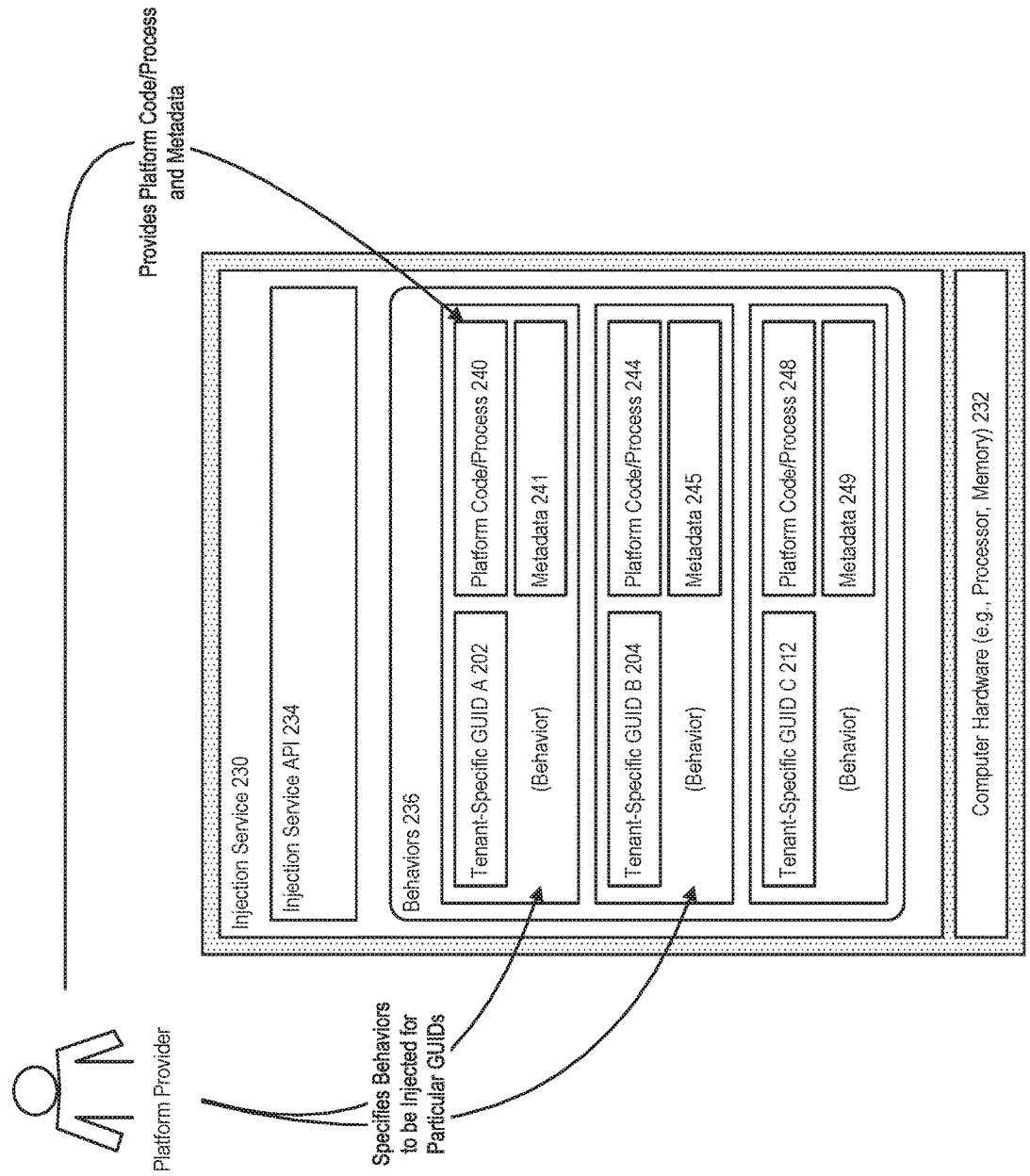
FIG. 7 further illustrates a system for behavior injection in cloud computing platforms or software applications, in accordance with an embodiment.

FIG. 7 further illustrates a system for behavior injection in cloud computing platforms or software applications, in accordance with an embodiment.

As illustrated in FIG. 7, in accordance with an embodiment, an injection service 230 can be provided at one or more computers that includes a computer hardware (e.g., processor, memory) 132, and provides an injection service application program interface (API) 234 that enables communication with the injection service.

In accordance with an embodiment, the injection service enables a cloud platform provider to configure (for example, via a configuration file, graphical user interface, or other configuration means) a plurality of software code/behaviors 236 that can be injected into cloud platform modules or other components associated with tenants.

In accordance with an embodiment, the injection service enables mapping, for each of a plurality of tenant-specific GUIDs associated with lifecycle activity injection points, a behavior including a platform code or process and metadata that can be used to inject and modify operation of a corresponding module.

For example, in accordance with an embodiment and the example illustrated in FIG. 7, a first GUID A 202 can be mapped to a platform code or process 240 and a metadata 241 that can be used to inject and modify operation of a corresponding module. A second GUID B 204 can be similarly mapped to a platform code or process 244 and a metadata 245 that can be used to inject and modify operation of a corresponding module. A third GUID C 212 can be similarly mapped to a platform code or process 248 and a metadata 249 that can be used to inject and modify operation of a corresponding module In accordance with an embodiment, the components and processes illustrated in FIG. 7, and as further described herein with regard to various other embodiments, can be provided as software or program code executable by a computer system or other type of processing device.

Figure 8:
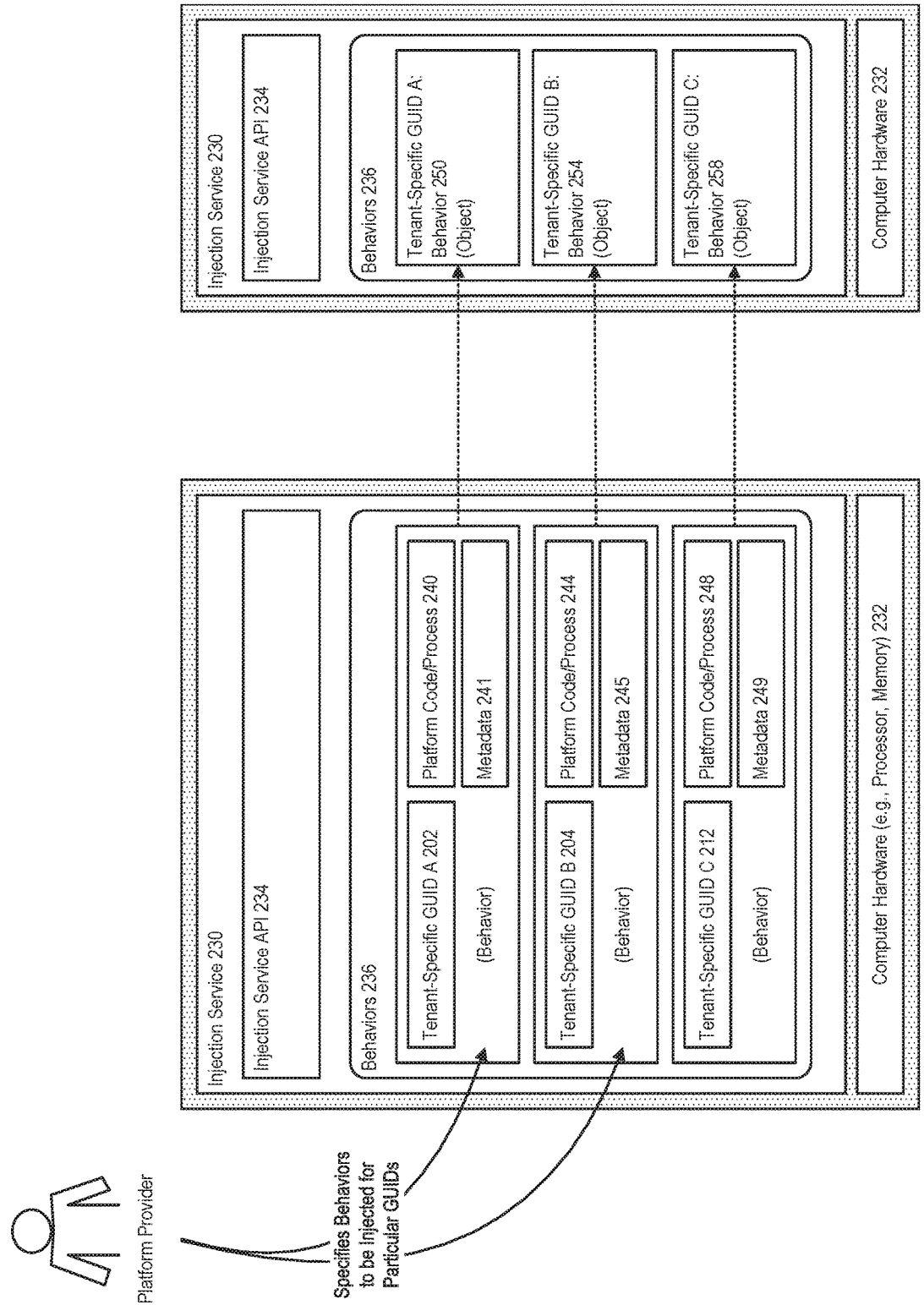
FIG. 8 further illustrates a system for behavior injection in cloud computing platforms or software applications, in accordance with an embodiment.

FIG. 8 further illustrates a system for behavior injection in cloud computing platforms or software applications, in accordance with an embodiment.

As illustrated in FIG. 8, in accordance with an embodiment, for each of the tenant-specific GUIDs mapped by the injection service, the injection service can store one or more software objects associated with the behaviors to be injected, such as, in this example, behaviors (objects) 250, 254, 258, for subsequent providing to a requesting module.

In accordance with an embodiment, the system can support a variety of different types of platform code or process and metadata that can be used to inject various types of behaviors into a cloud platform, such as, for example:

Custom class loaders that can be used to run JAVA™ code.

Commands or scripts that can be executed on the compute node of the software application platform.

A separate process that can be spawned to perform an activity.

A remote activity that can be performed to change state.

In accordance with an embodiment, the metadata maintained by the injection service can be used to help the cloud software application/platform to understand the steps to apply the new behavior. For example, metadata can be provided as a JSON or XML document listing the steps required to change a corresponding behavior. The platform can then use the received metadata to understand which behavior is required, and then run a corresponding script or code.

In accordance with an embodiment, the injection service can be maintained by the software application/platform provider as a secured service, such that only authorized users can update this service and the mapped information.

In accordance with an embodiment, a cloud software application/platform can interact with the injection service to find a behavior to inject, in a secure manner, for example using HTTPS, a service-service integration, or a client credentials grant.

For example, in accordance with an embodiment, when a particular feature is enabled, say for pre-activation, then the integration platform can run a pre-activation logic, that makes an HTTP request to the injection service, to obtain any corresponding behavior to be injected. The tenant platform is then updated, without requiring patching or an updated to the cloud platform itself.

In accordance with various embodiments, for example an Oracle Integration Cloud, that provide a feature flag service to enable/disable a particular feature for a tenant; the approach described above can utilize the feature flag service to enable behavior injection feature for a particular tenant and a particular lifecycle activity. In such an embodiment, the injection service should be updated with the behavior to be injected before the feature flag is enabled for the tenant.

In accordance with an embodiment, the injection service and API can be provide as a RESTful web service hosted outside of the cloud platform, and the change of behavior of a module/activity within the platform can be performed from outside of the cloud platform via calls to the RESTful web service.

In accordance with an embodiment, to avoid performance issues, a cache of injected behaviors can be maintained, which helps avoid multiple HTTP requests to check behaviors at the injection service at runtime.

For example, in accordance with an embodiment, each lifecycle activity can be associated with two injection points, for example "pre-processing" and "post-processing". These enable the system to inject behavior before and after the activity respectively. Using an example of an activation process of an integration flow, there can be two injection points for activation—referred to as pre-activation and post-activation.

In this example, if there is an issue with the activation of a flow for a particular tenant, depending upon whether a behavior change is needed before activation or after activation, then a tenant-specific GUID is generated.

For example, in accordance with an embodiment, for pre-activation the tenant-specific GUID can be: <TENANT_ID>_<PRE_ACTIVATION> and for post-activation the tenant-specific GUID can be: <TENANT_ID>_<POST_ACTIVATION>

The GUID is provided to the injection service, and in accordance with an embodiment, if a particular behavior is indicated, then the injection service can return the behavior, for example, as an object, to the requesting module. The cloud platform can then determine, based on the metadata in the object, how to modify the cloud platform for the particular tenant and the particular activity indicated by the GUID, in this instance the activation modules.

Figure 9:
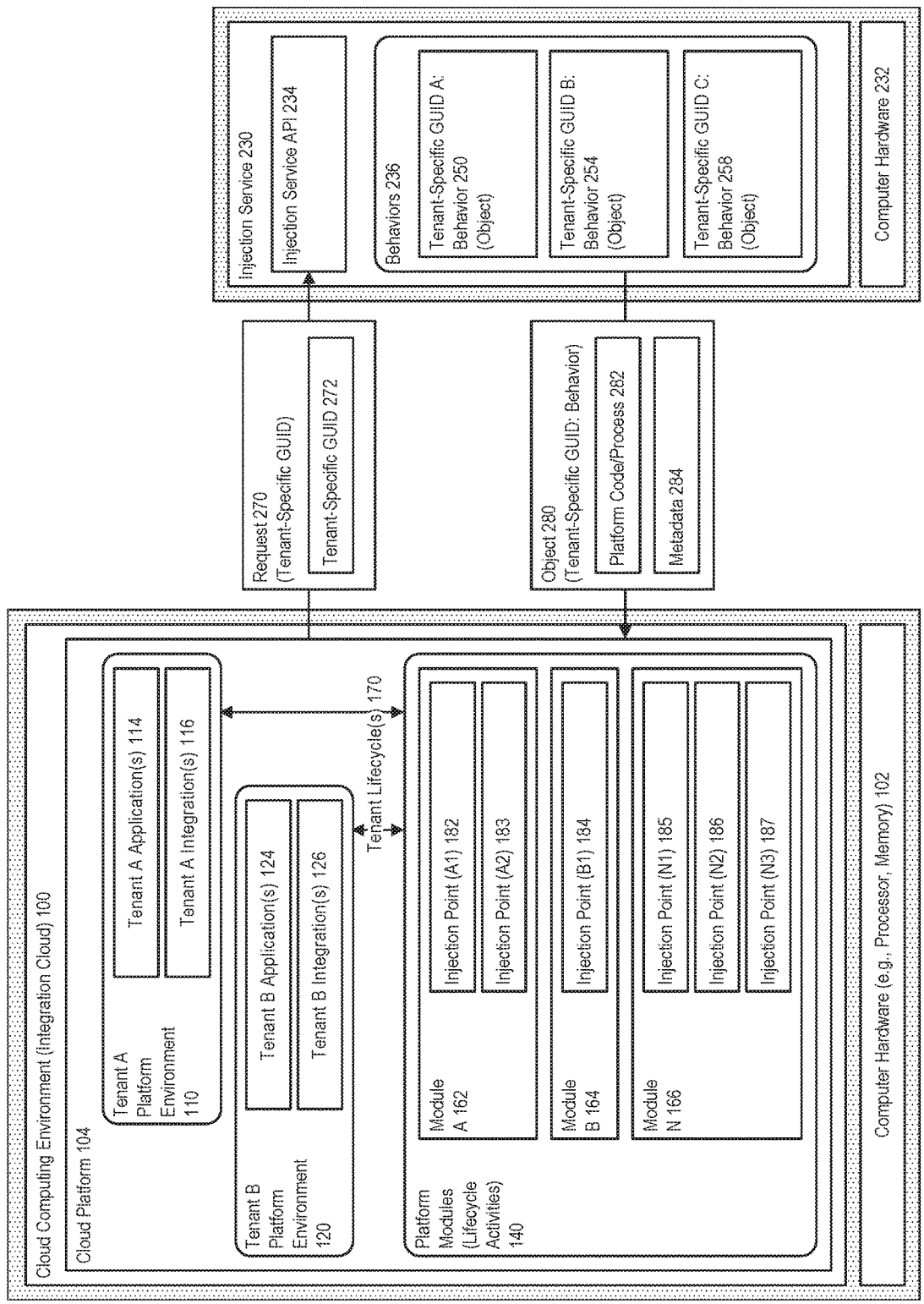
FIG. 9 further illustrates a system for behavior injection in cloud computing platforms or software applications, in accordance with an embodiment.

FIG. 9 further illustrates a system for behavior injection in cloud computing platforms or software applications, in accordance with an embodiment.

As illustrated in FIG. 9, in accordance with an embodiment, injection points associated with lifecycle activities can be used to check for behaviors to be injected, by checking the injection service using their tenant-specific GUID. In accordance with an embodiment, a request 270 is communicated by the cloud platform on behalf of the tenant platform, including the GUID 272, to the injection service.

When the injection service finds a code/behavior corresponding to the GUID in the request, it provides as a response 280 a software object providing the code/behavior to the requesting module to be executed thereby. For example, the software object can include the platform code or process 282 and metadata 284 specified by the platform provider in configuring that particular GUID in the injection service.

Figure 10:
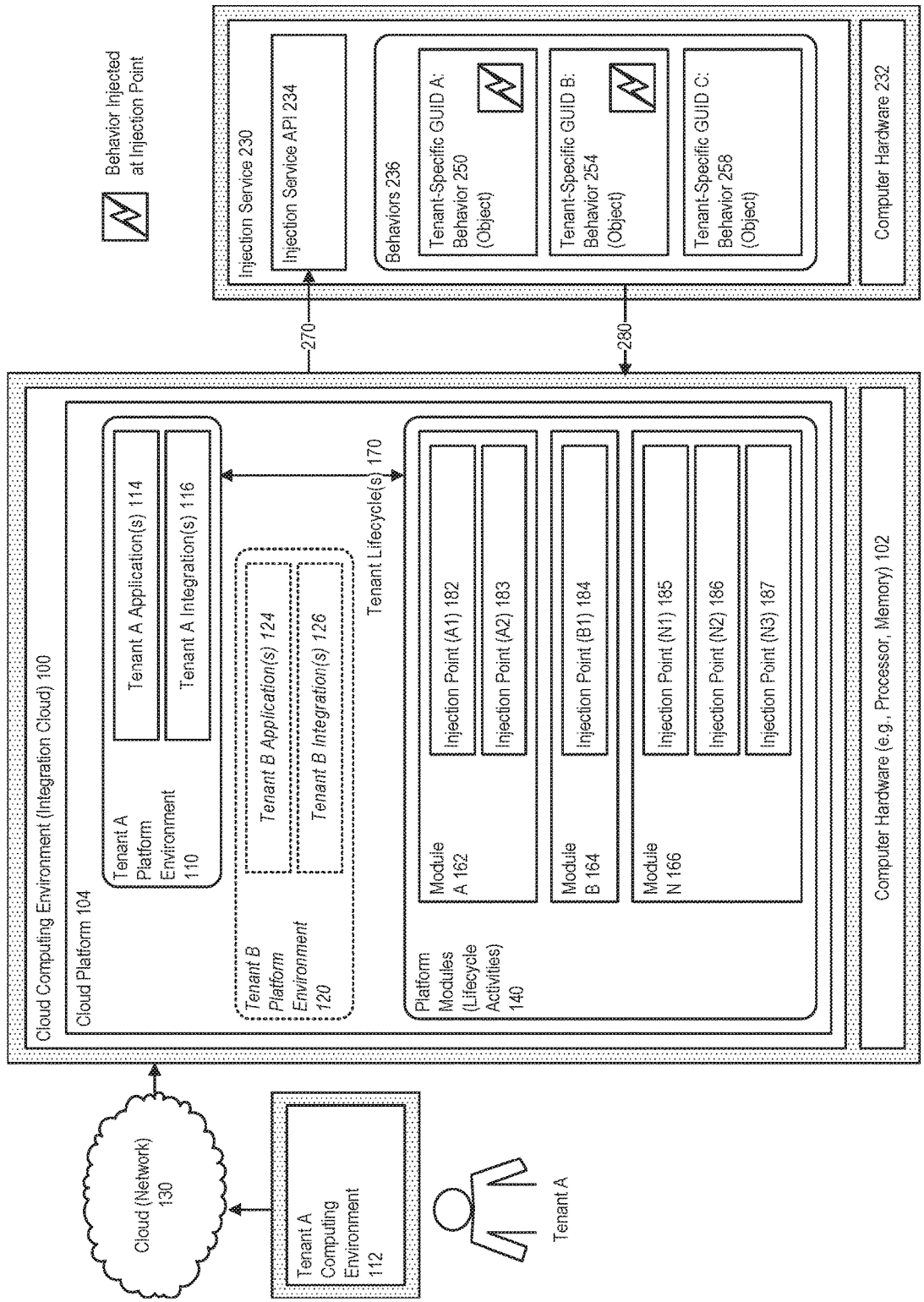
FIG. 10 further illustrates a system for behavior injection in cloud computing platforms or software applications, in accordance with an embodiment.

FIG. 10 further illustrates a system for behavior injection in cloud computing platforms or software applications, in accordance with an embodiment.

As illustrated in FIG. 10, in accordance with an embodiment, the system described herein can be used to expose behavioral aspects of the cloud platform or a software application executing therein, so that they can be controlled or modified in a dynamic manner, from outside of the cloud platform, including in this example, for tenant A.

Figure 11:
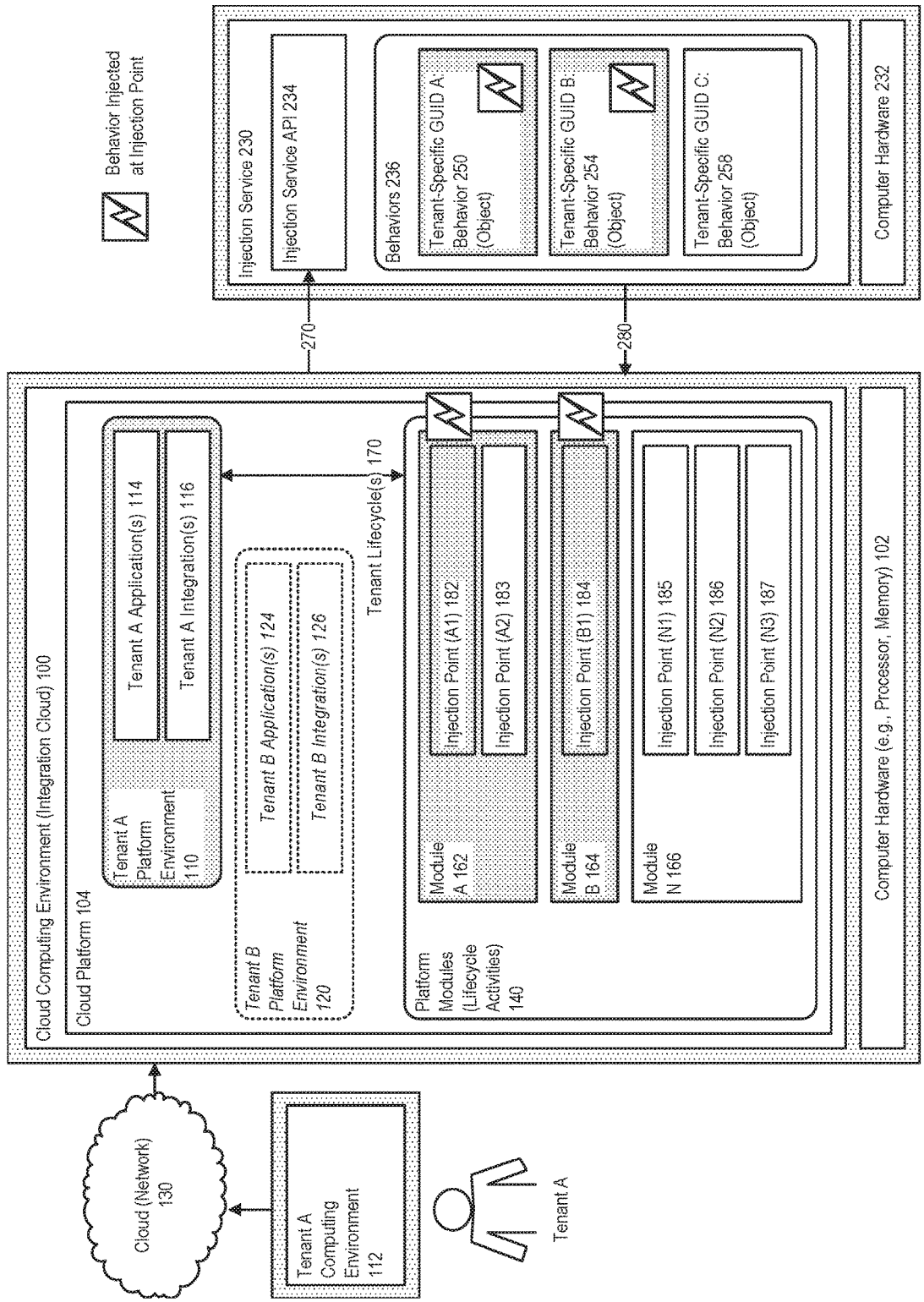
FIG. 11 further illustrates a system for behavior injection in cloud computing platforms or software applications, in accordance with an embodiment.

FIG. 11 further illustrates a system for behavior injection in cloud computing platforms or software applications, in accordance with an embodiment.

As illustrated in FIG. 11, in accordance with an embodiment, tenant A can be associated with a plurality of tenant-specific GUIDs including (continuing the example described above) a first GUID A 202 that references injection point (A1) in module A; and a second GUID B 204 that references injection point (B1) in module B—which the injection service has associated with behaviors 250 and 254 respectively. Upon communication of those GUIDs to the injection service, and upon receipt of the software objects from the injection service, those behaviors are injected into the corresponding injection points, for use by tenant A.

Figure 12:
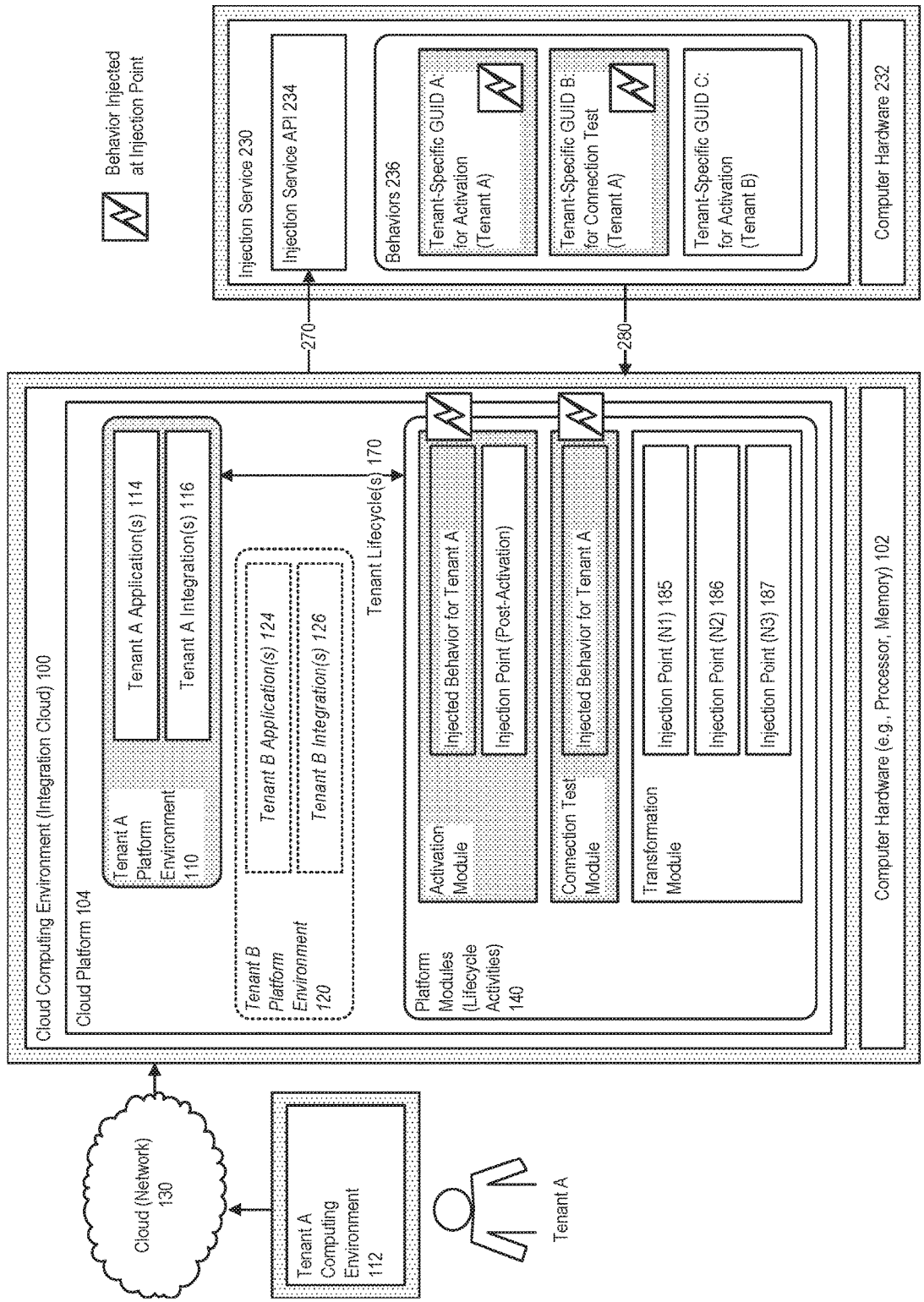
FIG. 12 further illustrates a system for behavior injection in cloud computing platforms or software applications, in accordance with an embodiment.

FIG. 12 further illustrates a system for behavior injection in cloud computing platforms or software applications, in accordance with an embodiment.

As illustrated in FIG. 12, in accordance with an embodiment that includes for example, an activation module that includes pre-activation and post-activation injection points; and a connection module that includes an injection point; the above-described approach can be used to inject a behavior into the operation of the activation module at its pre-activation injection points, and the connection module, both of which behavior modifications are specific to tenant A. in this example, the platform operations and lifecycle associated with tenant B are not affected.

Figure 13:
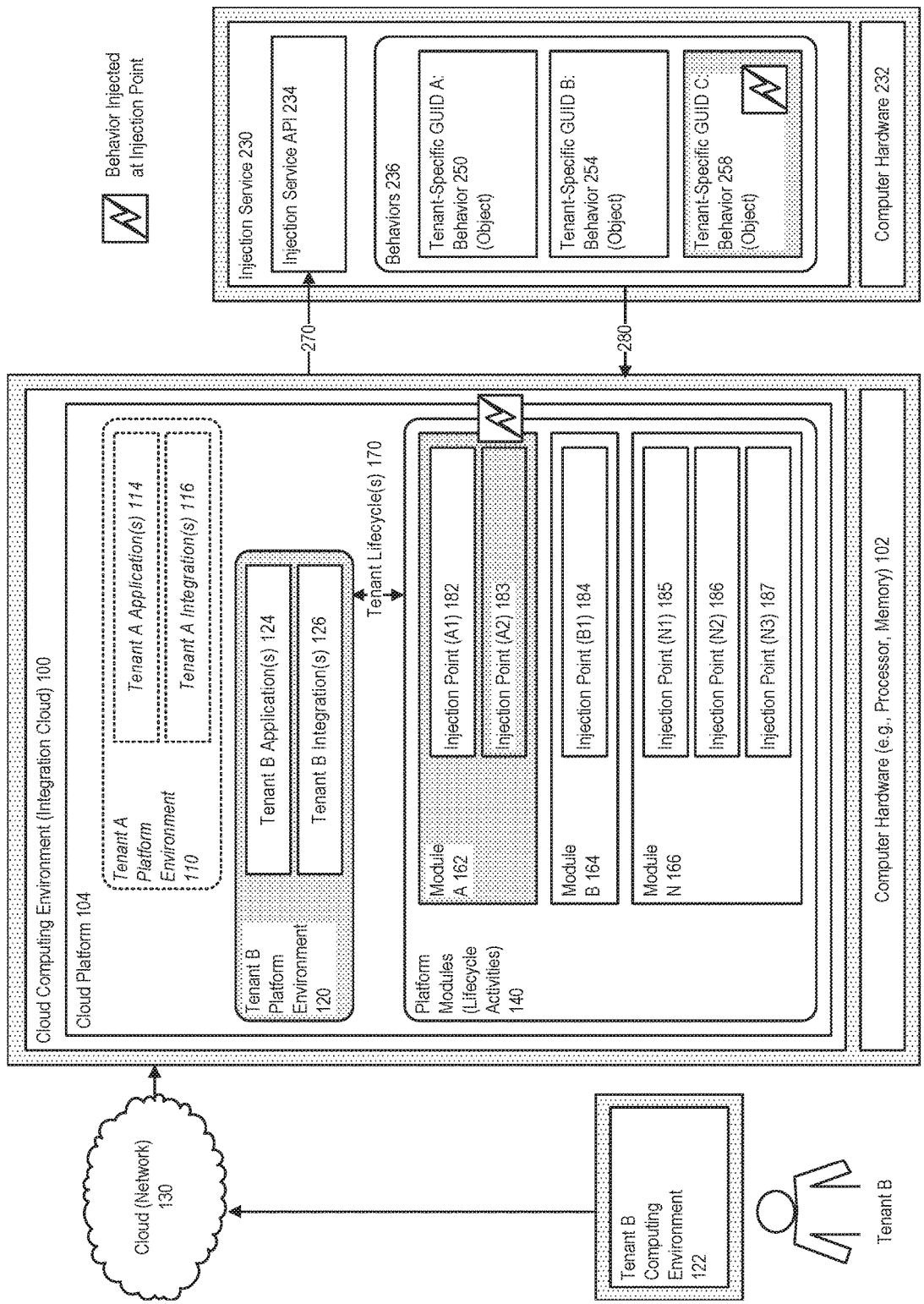
FIG. 13 further illustrates a system for behavior injection in cloud computing platforms or software applications, in accordance with an embodiment.

FIG. 13 further illustrates a system for behavior injection in cloud computing platforms or software applications, in accordance with an embodiment.

As illustrated in FIG. 13, in accordance with an embodiment, and the example shown and described above, tenant B can be associated with a plurality of tenant-specific GUIDs including a GUID C 212 that references injection point (A2) in module A—which the injection service has associated with a behavior 258. Upon communication of that GUID to the injection service, and upon receipt of the software objects from the injection service those behaviors are injected into the corresponding injection points.

Figure 14:
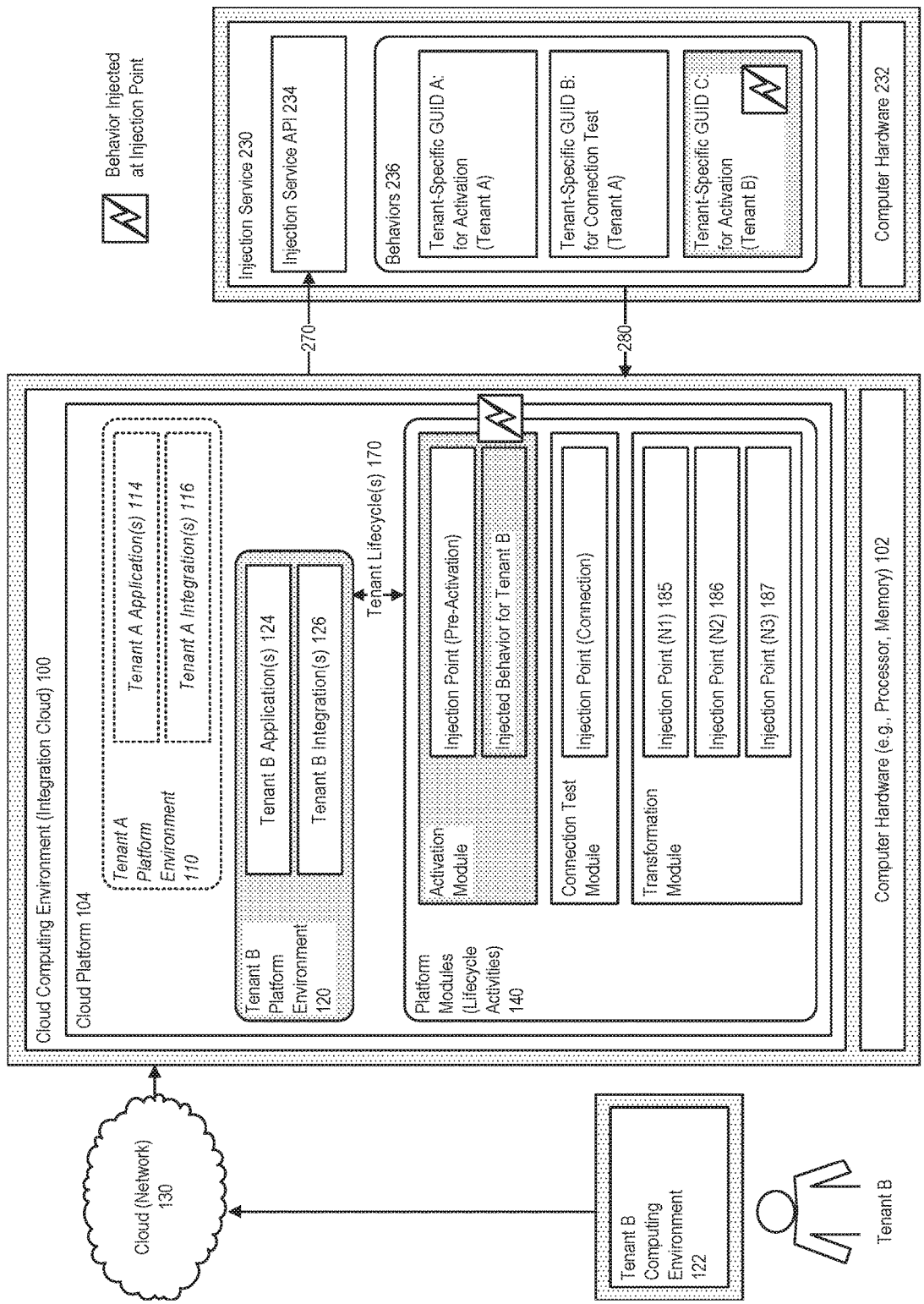
FIG. 14 further illustrates a system for behavior injection in cloud computing platforms or software applications, in accordance with an embodiment.

FIG. 14 further illustrates a system for behavior injection in cloud computing platforms or software applications, in accordance with an embodiment.

As illustrated in FIG. 14, in accordance with an embodiment that includes for example, an activation module that includes pre-activation and post-activation injection points; the above-described approach can be used to inject a behavior into the operation of the activation module at its post-activation injection point, which behavior modification is specific to tenant B. In this example, the platform operations and lifecycle associated with tenant A are not affected.

In accordance with an embodiment, using the above-described approach, the cloud platform can expose behavioral aspects of the cloud platform or a software application executing therein, so that they can be controlled or modified in a dynamic manner, from outside of the cloud platform—including customizing the operation of the platform to address the needs of specific tenant, without affecting operation for other tenants.

Behavior Injection Process

Figure 15:
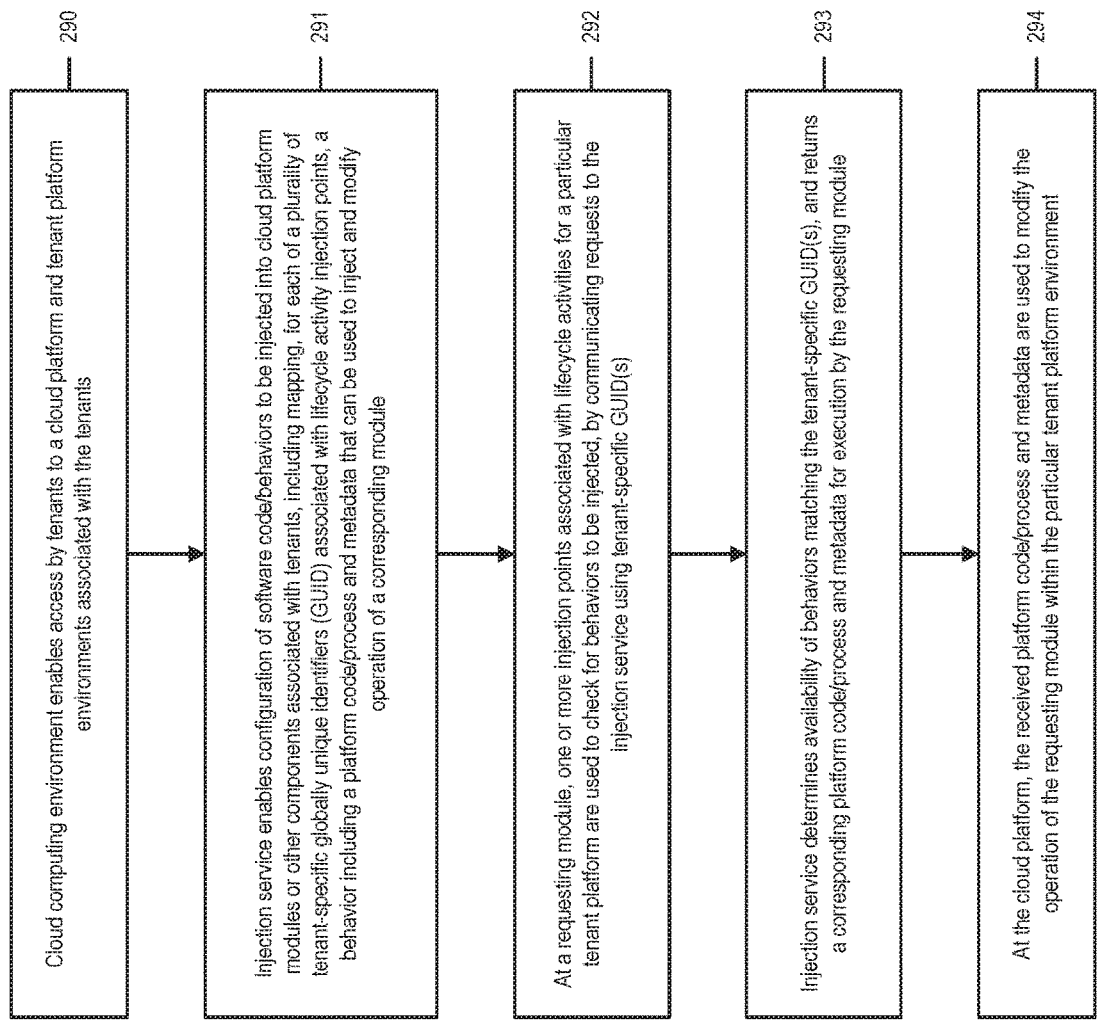
FIG. 15 illustrates a flowchart of a method for behavior injection in cloud computing platforms or software applications, in accordance with an embodiment.

FIG. 15 illustrates a flowchart of a method for behavior injection in cloud computing platforms or software applications, in accordance with an embodiment.

As illustrated in FIG. 15, in accordance with an embodiment, at step 290, a cloud computing environment enables access by tenants to a cloud platform and tenant platform environments associated with the tenants.

At step 291, an injection service enables configuration of software code/behaviors to be injected into cloud platform modules or other components associated with tenants, including mapping, for each of a plurality of tenant-specific globally unique identifiers (GUID) associated with lifecycle activity injection points, a behavior including a platform code or process and metadata that can be used to inject and modify operation of a corresponding module.

At step 292, at a requesting module, one or more injection points associated with lifecycle activities for a particular tenant platform are used to check for behaviors to be injected, by communicating requests to the injection service using tenant-specific GUID(s).

At step 293, the injection service determines availability of behaviors matching the tenant-specific GUID(s), and returns a corresponding platform code or process and metadata for execution by the requesting module.

At step 294, at the cloud platform, the received platform code or process and metadata are used to modify the operation of the requesting module within the particular tenant platform environment.

Technical Advantages

In accordance with various embodiments, technical advantages of the systems and methods described herein can include, for example, those illustrated below.

1. In accordance with an embodiment, the described approach provides control to the cloud platform providers to unblock customers in case of regressions or issues.

2. In accordance with an embodiment, the described approach can be used to provide custom features to certain tenants without waiting for a new release.

3. In accordance with an embodiment, the described approach can help in identifying intermittent issues by injecting debugging behavior into the software application.

4. In accordance with an embodiment, the described approach provides customer satisfaction and helps in reducing service requests.

5. In accordance with an embodiment, the described approach provides improved control over the software application platform.

6. In accordance with an embodiment, the described approach helps manage issues outside of the cloud platform, for example, third party API issues, or connection issues The above examples are provided for purposes of illustration; in accordance with various embodiments, additional or other technical advantages can be provided.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for behavior injection in a cloud computing environment having a cloud platform or software application executing therein, comprising:
   a computer including one or more processors;
   an injection service operating on the computer, that enables configuration of software code or behaviors to be injected into modules at the cloud platform associated with tenants of the cloud computing platform;
   wherein the injection service provides a mapping, for each of a plurality of globally unique identifiers (GUID) associated with lifecycle activity injection points, a platform code or process and metadata that can be used to inject and modify operation of a corresponding module, the metadata being maintained by the injection service, each GUID being associated with a tenant and referencing a unique lifecycle injection point associated with a respective tenant; and
   wherein at the cloud platform, a received platform code or process and metadata are used to modify the operation of a requesting module within a particular tenant platform environment associated with a tenant of the tenants of the cloud computing platform,
   wherein each of the tenants of the cloud computing platform are associated with one or more tenant platform environments provided by the cloud platform, the received platform code or process and metadata being received based on a request comprising a GUID from the requesting module to the injection service, the GUID of the request being associated with the tenant and referencing a unique lifecycle injection point associated with the tenant, the cloud platform utilizing the received metadata to determine a process by which to modify the operation of the requesting module within the particular tenant platform environment.

2. The system of claim 1, wherein at the requesting module, one or more injection points associated with lifecycle activities for a particular tenant platform are used to check for behaviors to be injected, by communicating one or more requests to the injection service using one or more tenant-specific GUIDs.

3. The system of claim 1, wherein the injection service determines availability of behaviors matching tenant-specific GUID(s) received in association with requests from the request module, and returns a corresponding platform code or process and metadata for execution by the requesting module.

4. The system of claim 1, wherein the injection service is provided as a RESTful web service or other service hosted outside of the cloud platform, and a change of behavior of a module and/or activity within the platform can be performed from outside of the cloud platform via calls to the service.

5. The system of claim 1, wherein the cloud platform exposes behavioral aspects of the cloud platform or a software application executing therein, said exposing of behavior aspects providing for control or modification thereof in a dynamic manner, from outside of the cloud platform.

6. The system of claim 1, wherein the cloud platform orchestrates use by the tenant platform environment, or by software applications executing therein, of various lifecycle activities provided within cloud platform as modules (components) as part of a tenant lifecycle associated with those modules.

7. The system of claim 1, wherein a tenant-specific GUID can be used to indicate the association of one or more (or all) tenants, with one or more module injection points, for purposes of requesting and receiving platform codes or processes from the injection service.

8. A method for behavior injection in a cloud computing environment having a cloud platform or software application executing therein, comprising:
   providing a computer including one or more processors;
   providing an injection service operating on the computer, the injection service enabling configuration of software code or behaviors to be injected into modules at the cloud platform associated with tenants of the cloud computing platform;
   providing, by the injection service, a mapping for each of a plurality of globally unique identifiers (GUID) associated with lifecycle activity injection points, a platform code or process, and metadata that can be used to inject and modify operation of a corresponding module, the metadata being maintained by the injection service, each GUID being associated with a tenant and referencing a unique lifecycle injection point associated with a respective tenant; and
   wherein at the cloud platform, a received platform code or process and metadata are used to modify the operation of a requesting module within a particular tenant platform environment associated with a tenant of the tenants of the cloud computing platform,
   wherein each of the tenants of the cloud computing platform are associated with one or more tenant platform environments provided by the cloud platform, the received platform code or process and metadata being received based on a request comprising a GUID from the requesting module to the injection service, the GUID of the request being associated with the tenant and referencing a unique lifecycle injection point associated with the tenant, the cloud platform utilizing the received metadata to determine a process by which to modify the operation of the requesting module within the particular tenant platform environment.

9. The method of claim 8, wherein at the requesting module, one or more injection points associated with lifecycle activities for a particular tenant platform are used to check for behaviors to be injected, by communicating one or more requests to the injection service using one or more tenant-specific GUIDs.

10. The method of claim 8, wherein the injection service determines availability of behaviors matching tenant-specific GUID(s) received in association with requests from the request module, and returns a corresponding platform code or process and metadata for execution by the requesting module.

11. The method of claim 8, wherein the injection service is provided as a RESTful web service or other service hosted outside of the cloud platform, and the change of behavior of a module and/or activity within the platform can be performed from outside of the cloud platform via calls to the service.

12. The method of claim 8, wherein the cloud platform exposes behavioral aspects of the cloud platform or a software application executing therein, said exposing of behavior aspects providing for control or modification thereof in a dynamic manner, from outside of the cloud platform.

13. The method of claim 8, wherein the cloud platform orchestrates use by the tenant platform environment, or by software applications executing therein, of various lifecycle activities provided within cloud platform as modules (components) as part of a tenant lifecycle associated with those modules.

14. The method of claim 8, wherein a tenant-specific GUID can be used to indicate the association of one or more (or all) tenants, with one or more module injection points, for purposes of requesting and receiving platform codes or processes from the injection service.

15. A non-transitory computer readable storage medium having instructions thereon, which when read and executed by a computer including one or more processors cause the computer to perform a method comprising:
   providing the computer including the one or more processors;
   providing an injection service operating on the computer, the injection service enabling configuration of software code or behaviors to be injected into modules at the cloud platform associated with tenants of the cloud computing platform;
   providing, by the injection service, a mapping for each of a plurality of globally unique identifiers (GUID) associated with lifecycle activity injection points, a platform code or process, and metadata that can be used to inject and modify operation of a corresponding module, the metadata being maintained by the injection service, each GUID being associated with a tenant and referencing a unique lifecycle injection point associated with a respective tenant; and
   wherein at the cloud platform, a received platform code or process and metadata are used to modify the operation of a requesting module within a particular tenant platform environment associated with a tenant of the tenants of the cloud computing platform,
   wherein each of the tenants of the cloud computing platform are associated with one or more tenant platform environments provided by the cloud platform, the received platform code or process and metadata being received based on a request comprising a GUID from the requesting module to the injection service, the GUID of the request being associated with the tenant and referencing a unique lifecycle injection point associated with the tenant, the cloud platform utilizing the received metadata to determine a process by which to modify the operation of the requesting module within the particular tenant platform environment.

* * * * *